Patented May 11, 1954 2,678,331

UNITED STATES PATENT OFFICE 2,678,331

NEW CYANO-ACETOPHENONE COMPOUNDS

Samuel Kushner, Nanuet, N. Y., assignor to American Cyanamid Company, New York, N. Y., a corporation of Maine No Drawing. Application May 3, 1952, Serial No. 286,032

1 Claim. (Cl. 260—465)

This invention relates to certain new cyano-acetophenone compounds and methods of preparing the same. The new class of compounds can be represented by the following general structural formula:

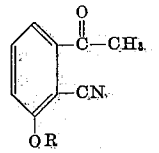

in which R represents a member selected from the group consisting of hydrogen and lower alkyl radicals, for instance methyl, ethyl and propyl.

The new compounds are generally crystalline solids and are useful as intermediates in organic synthesis. For instance, the new compounds can be employed as intermediates in the preparation of halogenated phthalide compounds having fungicidal activity by procedures disclosed in co-pending U. S. applications, Serial Number 286,035 and Serial Number 286,034 filed concurrently herewith. However, it is not intended that the invention be limited to any particular field or fields of utility.

While it is not intended that the invention be limited to the above new class of compounds when prepared by any one particular procedure, a convenient method of preparing the new class of compounds has been discovered and it is intended that this new method also constitute a part of the present invention. This new method comprises diazotizing an amino-acetophenone and treating the resulting diazonium compound with a complex formed from cuprous chloride and sodium cyanide. This new procedure may be more clearly illustrated by the following general equation:

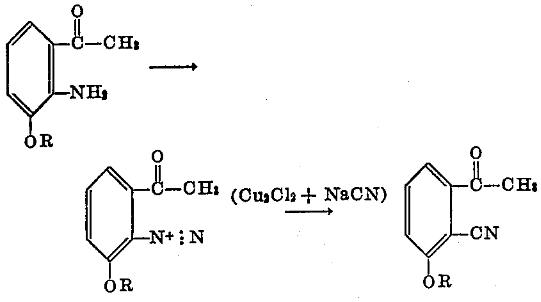

in which R is as previously defined.

As will be seen from the above equation, the new process is carried out in two steps, the first being the diazotization, and the second step being the formation of the cyano compound from the diazonium intermediate. However, the diazonium intermediate need not be isolated and the two steps can be carried out as a unitary operation. In other words, the new procedure preferably comprises simply treating a solution of the amino-acetophenone in sequence with two reagents.

Both steps of the new process of this invention can be advantageously performed in an inert solvent, and, generally speaking, the same solvent may be employed in both steps so that there is no need for isolation and transfer of the intermediate diazonium compound. The preferred inert solvent is one comprising water, since inorganic reagents are employed and these generally have advantageous solubilities in aqueous solvents. Of course, various organic solvents may also be present and are sometimes advantageously employed to increase the solubility of the organic reactant. In fact, the process can be performed completely in organic solution as will be more clearly shown by subsequent paragraphs.

The first step of the new process, consisting of the diazotization of the amino compound, can be performed by any of the well known procedures for diazotization. The preferred method comprises simply forming a solution of the amino compound in an aqueous solution of a mineral acid, for instance hydrochloric acid, and treating the resulting solution with a nitrite salt solution, for instance an aqueous solution of sodium nitrite. Of course, it is the nitrous acid, released by the nitrite salt when treated with the mineral acid, which actually performs the diazotization, and therefore any system which releases nitrous acid is satisfactory. An alternate method comprises forming an organic solution of the amino compound in an organic nitrite, followed by the addition of an organic carboxylic acid. For instance, the diazotization can be carried out by forming a solution of the amino compound in isoamyl nitrite and treating this solution with acetic acid.

The second step of the new process of this invention comprises treating the diazonium compound with a sodium cuprous cyanide complex prepared by reacting together stoichiometrical quantities of cuprous chloride and sodium cyanide. Such a complex is a reagent well known to those skilled in the art and is prepared by well known methods. This second step is usually performed by simply adding a solution containing a stoichiometrical quantity of the complex to the solution of diazonium compound as prepared in the first step. The sodium cuprous cyanide complex is preferably prepared in aqueous solution immediately before use and it is an advantage that is not necessary to isolate this complex, but rather the aqueous solution in which it is prepared can simply be mixed with the solution of the diazonium compound prepared in the first step of the new process. The resulting cyanoacetophenone compound is relatively insoluble in aqueous solution and precipitates from the reaction mixture as formed.

It is an advantage of the new process of this invention that it can be conducted at low temperatures. For instance, both steps of the process can be conducted at room temperature, i. e., 20° C. to 30° C., if desired, although the reaction is often quite vigorous at such temperatures and improved results are usually obtained by some measure of cooling. The reaction velocity is quite satisfactory at temperatures as low as the freezing point of the solution, and the preferred temperature range is −5° C. to +10° C., at least during the initial stages of reaction. After the initial intensity of the reaction has decreased somewhat, the reaction mixture can be warmed if desired to about 60° C. to 80° C., although this is not necessary. Both the diazotization reaction and the reaction of the diazonium compound with the sodium cuprous cyanide complex are strongly exothermic and quite rapid, and even with cooling and stirring some difficulty is often encountered in preventing an undue rise in the temperature of the reaction mixture. The reaction is reasonably complete when the temperature of the reaction mixture no longer shows a tendency to rise.

The invention will be more particularly illustrated by the following specific example in which all parts are by weight unless otherwise indicated.

*Example*

50 parts by weight of 2-amino-3-methoxyacetophenone are dispersed in 100 parts by volume of 28% HCl and the resulting solution cooled to about 0° C. To the cooled solution there is slowly added, with vigorous stirring and cooling, 30 parts by weight of sodium nitrite in about 85 parts by volume of water. After a few minutes the solution is carefully neutralized with sodium carbonate.

Cuprous chloride (prepared from 150 parts by weight of copper sulphate) is suspended in about 200 parts by volume of cool water and a solution of 70 parts by weight of sodium cyanide in 100 parts by volume of water, added slowly with stirring. The resulting sodium cuprous cyanide complex is cooled to about 0° C., and to the cooled solution there is added slowly, with vigorous stirring and cooling, the neutralized diazonium solution. The resulting mixture is held at a temperature of about 0° C. for an additional thirty minutes and then warmed slightly to about 50° C., with constant stirring. The mixture is then cooled and the resulting precipitate of 2-cyano-3-methoxyacetophenone removed and purified by recrystallization from benzene.

The procedure for preparing other 2-cyano-3-alkoxyacetophenones or 2-amino-3-hydroxyacetophenone is the same as above except that an equivalent quantity of the appropriate 2-amino-3-alkoxyacetophenone or 2-amino-3-hydroxyacetophenone is employed. For instance, 2-cyano-3-hydroxyacetophenone can be prepared by the procedure of the above example by substituting an equal molar quantity of 2-amino-3-hydroxyacetophenone for the 2-amino-3-methoxyacetophenone employed above, and 2-cyano-3-ethoxyacetophenone can be prepared by substituting an equal molar quantity of 2-amino-3-ethoxyacetophenone for the 2-amino-3-methoxyacetophenone employed in the above example.

I claim:

The new compound 2-cyano-3-hydroxyacetophenone.

References Cited in the file of this patent

Borsche, Chem. Abstracts, vol. 37, col. 5044 (1943).

Bogert et al., Beilstein (Handbuch, 4th ed.) 2nd sup., vol. 10, page 680 (1949).